May 22, 1923.

M. HAGEN

SIFTER

Filed Sept. 16, 1922

Minnie Hagen
INVENTOR

BY Victor J. Evans
ATTORNEY

H. A. LaBlair

WITNESS:

May 22, 1923.

M. HAGEN

SIFTER

Filed Sept. 16, 1922

Minnie Hagen
INVENTOR

BY Victor J. Evans
ATTORNEY

H. A. LaClair
WITNESS:

Patented May 22, 1923.

1,456,435

UNITED STATES PATENT OFFICE.

MINNIE HAGEN, OF ELLINWOOD, KANSAS.

SIFTER.

Application filed September 16, 1922. Serial No. 588,671.

*To all whom it may concern:*

Be it known that MINNIE HAGEN, a citizen of the United States, residing at Ellinwood, in the county of Barton and State of Kansas, has invented new and useful Improvements in Sifters, of which the following is a specification.

This invention relates to improvements in reversible flour sifters and has for its principal object to produce a device of this character which will thoroughly sift the ingredients from the upper to the lower portion of the receptacle and vice versa until the ingredients have been sifted to the desired lightness.

Another object of the invention is to produce a reversible flour sifter having a piece of fine wire gauze secured to the inner walls of the sifter or receptacle and spaced metallic sifting members arranged above and below the wire gauze for sifting the ingredients within the receptacle from the top to the bottom thereof and vice versa until the desired lightness of such ingredients has been obtained.

A further object of the invention is to produce a reversible flour sifter having the spaced sifting members arranged above and below a piece of fine wire gauze and the free ends of said members being twisted and passed through semi-spherical members and said members being held in locking engagement by means of socket members and means provided on the extreme outer ends of the twisted portions of the sifting members for manipulating the latter.

This invention also consists in certain other features of construction and in the combination and arrangement of the several parts, to be hereinafter fully described illustrated in the accompanying drawings and specifically pointed out in the appended claim.

In describing my invention in detail reference will be had to the accompanying drawings wherein like characters of reference denote like or corresponding parts in the several views, and in which :—

In the drawings :—

Figure 1:
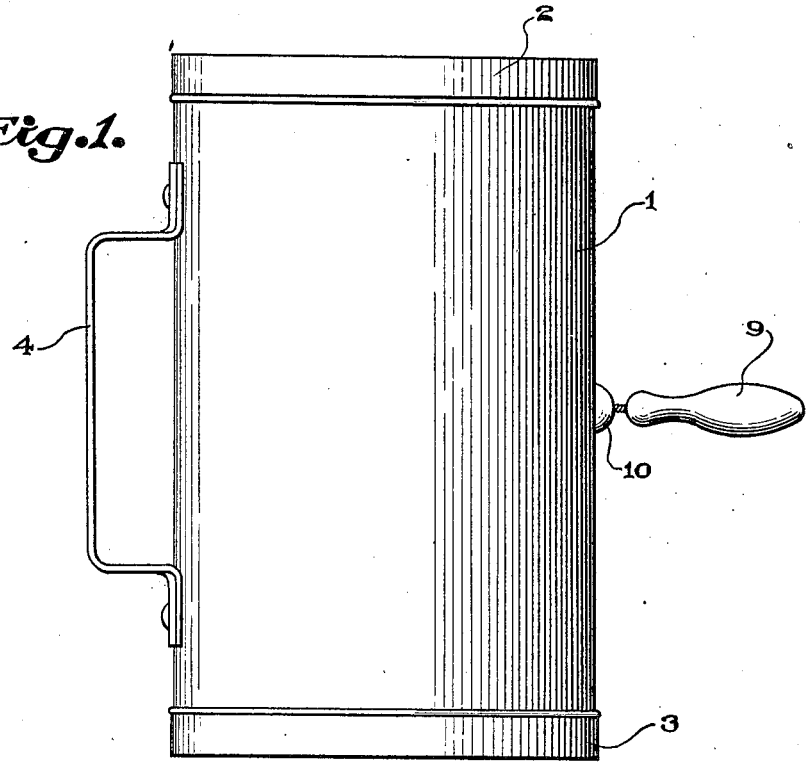
Figure 1 is a side elevation of the invention.
Figure 3:
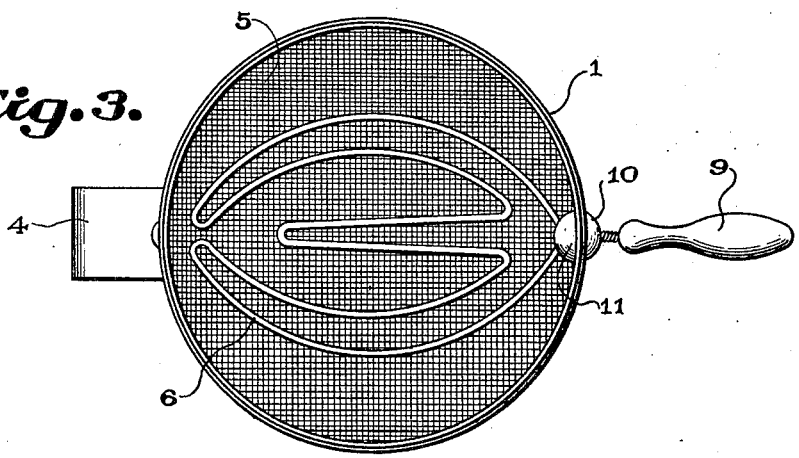
Figure 3 is a top plan view of the invention with the top removed.
Figure 2:
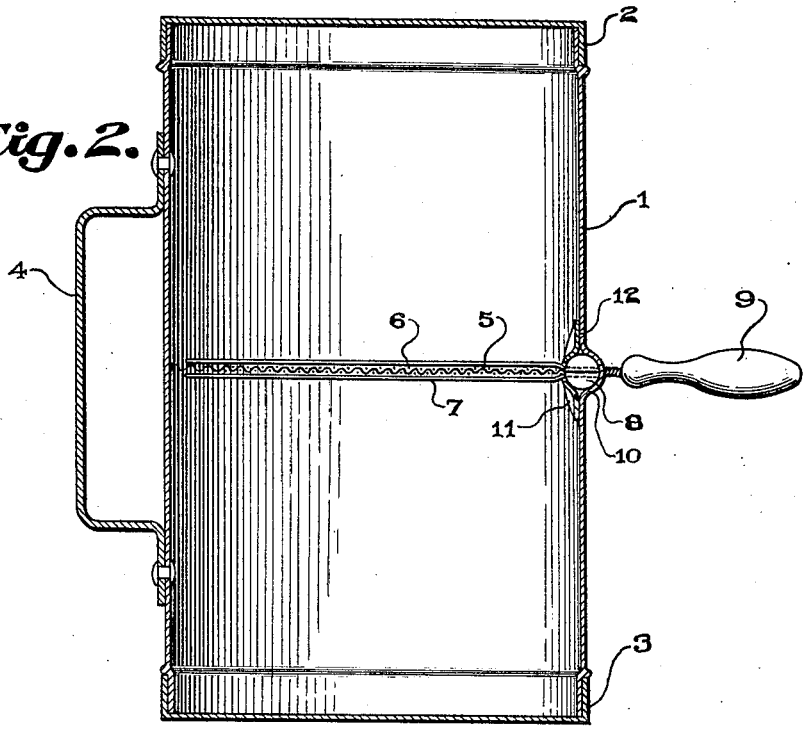
Figure 2 is a vertical longitudinal sectional view.
Figure 4:
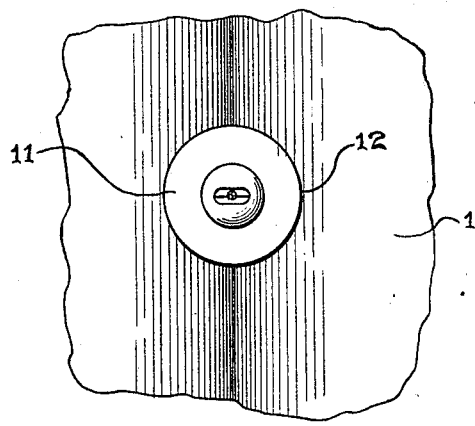
Figure 4 is a detail view of the socket member.

Referring now to the drawings wherein like characters of reference denote corresponding parts 1 indicates a receptacle having removable covers for its ends which are indicated by the numerals 2 and 3 respectively and a handle 4 connected to one side of the receptacle for moving the latter from place to place.

A piece of fine wire gauze 5 is arranged centrally within the receptacle and soldered to the walls thereof so that the ingredients placed upon said gauze may be thoroughly sifted. Spaced metallic sifting members are arranged above and below said wire gauze as indicated by the numerals 6 and 7 respectively and the ends of these members are twisted together and passed between semi-spherical members 8 and thence extended through the receptacle, and designed to carry a socketed operating handle 9, said semi-spherical members are held in clamping engagement by means of a socket 10 formed in the receptacle in confronting relation with a socket formed in the plate 11 and the semi-spherical members together with the socket members form a ball and socket connection so that the operating handle may be moved back and forth to operate the sifting members over the wire gauze, in order that the ingredients may be thoroughly sifted. The plate 11 is soldered to the walls of the receptacle as indicated by the numeral 12.

The ingredients may be placed in one portion of the receptacle by removing the adjacent cover and the same may be sifted into the other portion of the receptacle, and instead of emptying the ingredients from the last mentioned portion the user of the device simply turns the receptacle upside down and places the cover thereon so that the ingredients may be sifted back to the first mentioned portion. This operation may be continued until the desired lightness of the ingredients has been obtained which would usually be from two to three siftings.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A sifter of the class described comprising a receptacle having movable end walls, spaced metallic sifting members centrally arranged within the receptacle and having their ends twisted together, a wire gauze secured to the side walls of the receptacle and being arranged between the sifting members, a portion of a socket formed in said receptacle intermediate of its ends and being provided with a transverse elongated opening, a plate secured within the receptacle and having the other portion of the socket formed therein, and being provided with an elongated opening registering with the first mentioned opening, a pair of semi-spherical members loosely positioned in the socket and being adapted to have passed therebetween the twisted ends of the sifting members which pass through the openings and extending exteriorly of the receptacle and a handle carried by the extending ends.

In testimony whereof I affix my signature.

MINNIE HAGEN.